(12) United States Patent
Margiott et al.

(10) Patent No.: US 6,537,351 B2
(45) Date of Patent: Mar. 25, 2003

(54) COMPACT LIGHT WEIGHT CONDENSER ASSEMBLY

(75) Inventors: Paul R. Margiott, South Windsor, CT (US); Thomas J. Corrigan, Coventry, CT (US)

(73) Assignee: UTC Fuel Cells, L.L.C., So. Windsor, CT (US)

(*) Notice: Subject to any disclaimer, the term of this patent is extended or adjusted under 35 U.S.C. 154(b) by 0 days.

(21) Appl. No.: 09/866,994

(22) Filed: May 29, 2001

(65) Prior Publication Data

US 2002/0178920 A1 Dec. 5, 2002

(51) Int. Cl.$^7$ .......................... H01L 25/04; H01L 23/02
(52) U.S. Cl. .......................... 95/273; 76/242; 76/298; 76/299; 257/712; 257/714; 165/104.21; 165/104.26; 165/104.33; 361/689; 361/699; 361/700; 361/712; 361/713
(58) Field of Search .......................... 95/273; 96/242, 96/266, 298, 299; 257/712, 714; 165/104.21, 104.26, 104.33; 361/689, 699, 700, 712, 713

(56) References Cited

U.S. PATENT DOCUMENTS

| | | | | |
|---|---|---|---|---|
| 5,105,429 A | * | 4/1992 | Mundinger et al. | ........... 372/34 |
| 5,105,430 A | * | 4/1992 | Mundinger et al. | ........... 372/35 |
| 5,126,829 A | * | 6/1992 | Daikoku et al. | ............. 257/713 |
| 5,131,233 A | * | 7/1992 | Cray et al. | ............. 165/104.33 |
| 5,179,500 A | * | 1/1993 | Koubek et al. | ......... 165/104.14 |
| 5,453,641 A | * | 9/1995 | Mundinger et al. | ...... 165/104.4 |
| 6,140,266 A | | 10/2000 | Corrigan et al. | ............ 502/439 |

OTHER PUBLICATIONS

"*Fuel Cells for Electric Utilities*" by Gillis, Oct. 1980, Electric Power Research Institute, Palo Alto, CA. Oct. 1980.*

* cited by examiner

*Primary Examiner*—David A. Simmons
*Assistant Examiner*—Minh-Chau T. Pham
(74) *Attorney, Agent, or Firm*—William W. Jones

(57) ABSTRACT

A gas stream moisture condenser assembly for use in a fuel cell power plant includes a gas stream flow path which is formed from a monolithic open cell foam body. The foam body is preferably formed from a high temperature material such as stainless steel, nickel alloys and iron-aluminum alloys, or from a ceramic material. The foam body includes open cells or pores which are contained within a metal or ceramic lattice. Coolant tubes are in contact with the foam monolith so as to cool the lattice sufficiently to cause moisture in the gas stream to condense on a lattice surrounding the pores of the foam. The condensate migrates from the foam lattice into a reservoir. The condenser can be used to remove water from gas streams, such as a cathode exhaust stream or a mixed burner and cathode exhaust stream, of a fuel cell power plant.

4 Claims, 2 Drawing Sheets

COMPACT LIGHT WEIGHT CONDENSER ASSEMBLY

TECHNICAL FIELD

This invention relates to a moist gas stream condenser assembly. More particularly, this invention relates to a condenser assembly which employs a gas stream flow path formed from a monolithic open cell foam component, the cells or pores of which form a high surface area flow path through which the moist gas stream passes. The open cell foam component includes a monolithic lattice which frames all of the cells in the foam and which serves as a heat transfer body. The foam component has a plurality of coolant passage tubes embedded inside of the foam which serve to cool the lattice and thus cause moisture in the gas stream to condense in the cells of the foam component.

BACKGROUND ART

U.S. Pat. No. 4,344,850, granted Aug. 17, 1982 describes a fuel cell power plant assembly which includes a condenser for removing water from a cathode exhaust gas stream. The condenser receives the moist cathode exhaust gas stream and passes the exhaust gas stream over a coolant coil whereupon a portion of the moisture in the exhaust gas stream condenses out of the gas stream and settles into a water reservoir. The water thus collected is used to cool the fuel cell power plant active areas to prevent overheating of the fuel cell stack in the power plant and is also used to produce steam for a fuel gas steam reformer in the power plant. The coolant which is used in the condenser is air which is blown over the cathode exhaust stream. While the aforesaid condenser is servicable, it would be desirable to provide an increase in the cooled surface area on which the water will condense, and it would be desirable to be able to use other coolants in addition to air.

DISCLOSURE OF THE INVENTION

This invention relates to a condenser assembly which provides an increased surface area on which water can condense in the condenser, and which may be used with coolants other than air, although air may also be used as the coolant. The condenser may be used to condense water out of a moist gas stream in a fuel cell power plant, or may be used to condense water out of other types of moist gas streams. The condenser includes a very large surface area moist gas stream flow path which is cooled by a coolant fluid. The large surface area flow path is formed by a light weight monolithic open cell foam block, or a plurality of such foam blocks. The foam includes a plurality of interconnected open cells or pores which are contained in a lattice. The lattice is made from a highly efficient heat transfer material such as aluminum, stainless steel, aluminum-steel alloys, silicon carbide, nickel alloys, carbon, graphite, ceramics, or some similar suitable heat transfer material. The coolant is contained in tubes which are in direct contact with the foam monolith. To accomplish this, the tubes may be embedded in the foam monolith, or which may be sandwiched between adjacent foam monolith blocks. The coolant thus passes through the gas stream flow path and cools the lattice which forms a component of the gas stream flow path. Water will thus condense out of the moist gas stream onto the high surface area lattice in the gas stream flow path. The condensate can then fall by gravity or by other means into a reservoir adjacent to the condenser gas stream flow path. Coolants such as air, glycol, or the like can be utilized in the condenser assembly. When air is the coolant of choice, the coolant tubes may also be filled with the open cell foam in order to enhance heat transfer from the air stream to the coolant tubes.

It is therefore an object of this invention to provide an improved condenser assembly for condensing water or some other liquid out of a moist gas stream.

It is a further object of this invention to provide a condenser assembly of the character described which has an enhanced condensing surface area located in a gas flow path through which the moist gas stream is directed.

It is another object of this invention to provide a condenser assembly of the character described which includes a large surface area cooled open cell foam monolith through which the moist gas stream flows.

It is yet another object of this invention to provide a condenser assembly of the character described which includes one or more coolant fluid conduits which are in heat exchange contact with a lattice portion of the open cell foam monolith, the lattice portion forming a moisture condensing surface in the condenser.

BRIEF DESCRIPTION OF THE DRAWINGS

These and other objects and advantages of this invention will become readily apparent to one skilled in the art from the following detailed description of a preferred embodiment of the invention when taken in conjunction with the accompanying drawings in which.

SPECIFIC MODE FOR CARRYING OUT THE INVENTION

Figure 1:
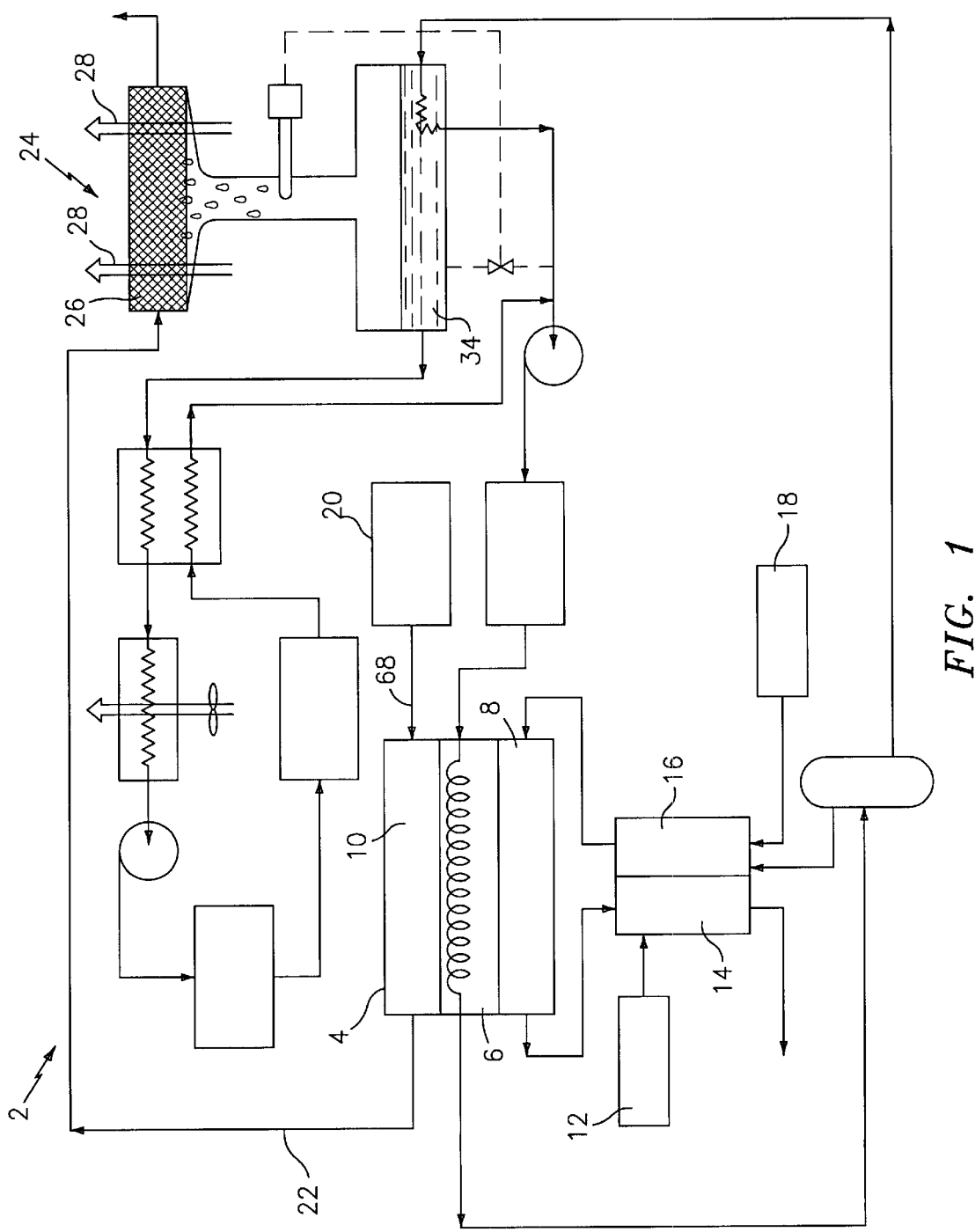
FIG. 1 is a schematic view of a fuel cell power plant system which includes one embodiment of a condenser which is formed in accordance with this invention and which is used for condensing water out of a cathode exhaust gas stream.

Referring now to the drawings, there is shown in FIG. 1 a schematic illustration of a fuel cell power plant denoted generally by the numeral 2, which includes a power section 4 having an electrolyte 6 sandwiched between an anode 8 and a cathode 10. A fuel source 12 is connected to a burner 14 which provides heat to a steam reformer 16 that converts a hydrocarbon fuel from a source 18 thereof to a hydrogen-rich gas which is fed into the anode side 8 of the power section 4 of the power plant 2. Air from a source 20 thereof is fed into the cathode side 10 of the power section 4 to provide oxygen for the reaction. The hydrogen and oxygen are converted to electrons and water in the power section 4. The product water from the reaction is vented from the power section, at least in part, in the cathode exhaust stream via line 22 which leads to a condenser assembly 24. The condenser assembly 24 contains a monolithic open cell foam body 26 through which the cathode exhaust gas stream flows. A plurality of coolant tubes 28 are disposed in heat exchange relationship with the foam body 26 and are operable to cool the foam body 26.

Figure 2:
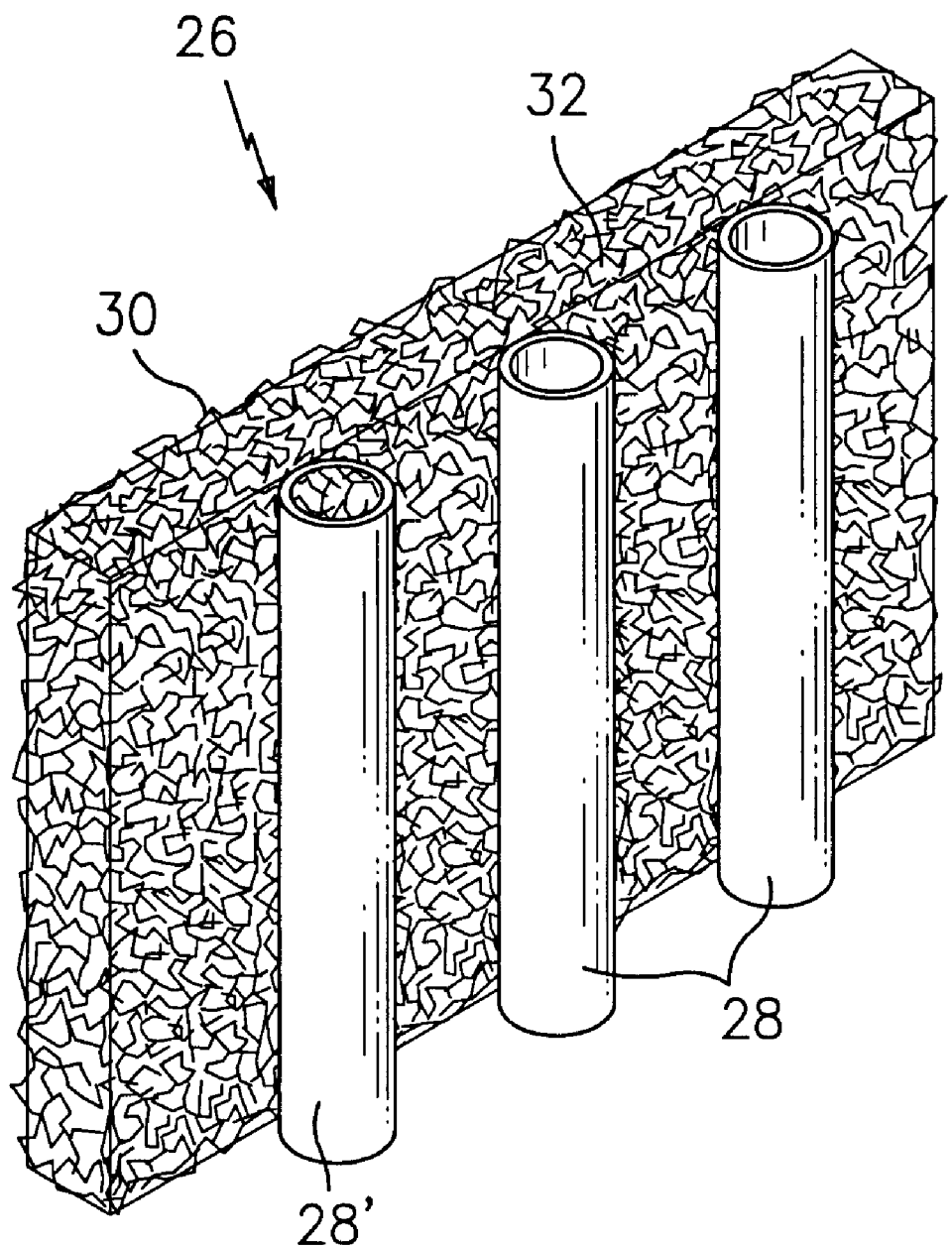
FIG. 2 is a perspective view on an open cell foam monolith of the type used in the condenser, and showing the manner in which the coolant fluid conduits can be arranged in heat exchange contact with a lattice component of the foam monolith.

Referring to FIG. 2, details of the foam body 26 and coolant tubes 28 are disclosed. The foam body 26 includes a pervasive lattice 30 which defines a matrix of open cells 32. The cells 32 are open to each other in the X, Y and Z directions so as to form a very diffuse gas flow pattern for any gas flowing through the foam 26. The coolant tubes 28 are hollow tubes through which a coolant such as air, glycol, or the like flows. The foam 26 may be formed around the tubes 28, or the tubes 28 may be samdwiched between adjacent blocks of the foam. When air is the coolant, there can be open cell foam rods inserted inside the tubes 28 to aid in heat transfer between the air coolant and the wall of the tubes 28, as shown in coolant tube 28'.

The condenser operates as follows. The moist cathode exhaust gas flows through the open cells 32 of the foam body 26 and the coolant stream flows through the coolant tubes 28. The lattice 30 in the foam body 26 is cooled to a temperature below the condensing temperature of the moisture in the cathode exhaust gas stream and the moisture thus condenses out of the gas stream onto the lattice 30. The condensate then simply drips down under the influence of gravity into a reservoir 34 (see FIG. 1) in the condenser assembly 24. The recovered water from the reservoir 34 can then be used as a coolant for the power plant 2 or as a source of steam for the steam reformer 16, or both. Monolith foams of the type described above can be obtained from Porvair Advanced Material, Inc., Hendersonville, N.C.

It will be noted that the specific system shown in FIG. 1 utilizes the condenser assembly of this invention to condense water out of a moist cathode exhaust gas stream in a fuel cell power plant assembly. It will be readily appreciated that the condenser assembly of this invention could readily be used to condense water out of any moist gas stream, such as an anode exhaust, or a burner exhaust, which is directed through the open cell foam gas flow member of the condenser assembly.

Since many changes and variations of the disclosed embodiment of the invention may be made without departing from the inventive concept, it is not intended to limit the invention other than as required by the appended claims.

What is claimed is:

1. A condenser assembly for condensing water out of a moist gas stream, said assembly comprising:
   a) a monolithic open cell foam body which forms a gas flow path for the moist gas stream, said foam body including a thermally conductive lattice which defines a matrix of open cells throughout the foam body;
   b) one or more coolant conduits in contact with said foam body such that each of said coolant conduits including an outer wall which contacts said thermally conductive lattice;
   c) means for directing the moist gas stream into said open cells in said foam body; and
   d) means for directing a coolant fluid into said coolant conduits whereby said themally conductive lattice is cooled thereby causing said themally conductive lattice to cool so as to condense water out of the moist gas stream.

2. The condenser assembly of claim 1 wherein said coolant conduits include an internal open cell foam lattice which contacts said outer wall and through which the coolant fluid flows.

3. A method for condensing water out of a moist gas stream, said method comprising the steps of:
   a) passing the moist gas stream through a monolithic open cell foam body, said foam body including a thermally conductive lattice which defines a matrix of open cells throughout the foam body through which cells the moist gas stream flows; and
   b) passing a coolant fluid through one or more coolant conduits which are in contact with said foam body such that each of said coolant conduits including an outer wall which contacts said thermally conductive lattice whereby said thermally conductive lattice is cooled sufficiently to condense water out of the moist gas stream and into said open cells.

4. The method of claim 3 wherein said coolant conduits include internal open cell foam components which contact the outer walls of said coolant conduits and are operative to enhance thermal transfer from said coolant fluid to said outer walls of said coolant conduits.

* * * * *